United States Patent [19]

Anderson et al.

[11] Patent Number: 5,039,858
[45] Date of Patent: Aug. 13, 1991

[54] DIVALENT FLUORIDE DOPED CERIUM FLUORIDE SCINTILLATOR

[76] Inventors: David F. Anderson, 630 Sylvan Pl., Batavia, Ill. 60510; Robert W. Sparrow, 28 Woodlawn Dr., Sturbridge, Mass. 01566

[21] Appl. No.: 473,056

[22] Filed: Jan. 31, 1990

[51] Int. Cl.$^5$ .............................. G01T 1/202
[52] U.S. Cl. ............................... 250/363.03
[58] Field of Search ..................... 252/301.4 H; 250/363.03

[56] References Cited

U.S. PATENT DOCUMENTS

| | | | |
|---|---|---|---|
| 2,254,956 | 9/1941 | Aschermann et al. | 252/301.4 F |
| 2,450,548 | 10/1948 | Gislof et al. | 313/486 |
| 2,476,681 | 7/1949 | Overbeek et al. | 313/486 |
| 4,510,394 | 4/1985 | Allemand et al. | 250/483.1 |

FOREIGN PATENT DOCUMENTS 0143034  5/1985  European Pat. Off.
61327   2/1948  Netherlands.

OTHER PUBLICATIONS

G. Blasse and A. Bril, "Energy Transfer in Tb$^{3+}$-Activated Cerium(III) Compounds." *The Journal of Chemical Physics*, vol. 51, No. 8 (Oct. 15, 1969), pp. 3252–3254.

Kröger et al., "Luminescence Of Cerium Compounds", (7/41), *Physica VIII*, No. 7.

Heath et al., "Inorganic Scintillators: A Review of Techniques and Applications", (1979), *Nuclear Instruments And Methods*, vol. 162.

Knoll, "Scintillation Detector Principles", (1979), *Radiation Detection And Measurement*, John Wiley and Sons, ch. 8.

Allemand et al., "Potential Advantages of a Cerium Fluoride Scintillator for a Time-of-Flight Positron Camera", (1980), *Journal of Nuclear Medicine*, vol. 21, No. 2.

Ter-Pogossian, "Positron Emission Tomography", (10/80), *Scientific American*, vol. 243.

Allemand et al., "New Development In Fast Timing With BaF$_2$ Scintillator", (6/11/82), Laboratoire d'Electronique et de Technologie de l'Informatique (LETI/MCTE/82-245).

Oberg, "Window On The Brain", (8/82), *Science Digest*.

Derenzo et al., "High Resolution Positron Emission Tomography Using Small Bismuth Germanate Crystals And Individual Photosensors", *IEEE Transactions on Nuclear Science*, vol. NS-30, No. 1, (2/83).

Buchsbaum, "The Mind Readers", (7/83), *Psychology Today*.

Rasminsky, "Seen At Last: The Brain At Work", (1/84), *Reader's Digest*.

Fox, "PET Scan Controversy Aired", (4/13/84), *Science*, vol. 224.

Phelps et al., "Positron Emission Tomography: Human Brain Function and Biochemistry", (5/17/85), *Science*, vol. 228, No. 4701.

Derenzo, "Recent Developments in Positron Emission Tomography (PET) Instrumentation", (1986), *Society of Optical Instrumentation Engineers*, vol. 671.

(List continued on next page.)

Primary Examiner—Constantine Hannaher
Attorney, Agent, or Firm—Neuman, Williams, Anderson & Olson

[57] ABSTRACT

The use of divalent fluoride dopants in scintillator materials comprising cerium fluoride is disclosed. The preferred divalent fluoride dopants are calcium fluoride, strontium fluoride, and barium fluoride. The preferred amount of divalent fluoride dopant is less than about two percent by weight of the total scintillator. Cerium fluoride scintillator crystals grown with the addition of a divalent fluoride have exhibited better transmissions and higher light outputs than crystals grown without the addition of such dopants. These scintillators are useful in radiation detection and monitoring applications, and are particularly well suited for high-rate applications such as positron emission tomography (PET).

31 Claims, 6 Drawing Sheets

TRANSMISSION AND EMISSION OF 99% PURE CeF$_3$
DOPED WITH 0.5% OF EITHER CaF$_2$ OR BaF$_2$

OTHER PUBLICATIONS (Anonymous), "PET Penetrates Inner Sanctum of Running Engines", (6/2/86), *Design News*.

Jacobson (ed.), "Instrumentation in Positron Emission Tomography", (3/11/88), *Journal of the American Medical Association*, vol. 259, No. 10.

Anderson, "Properties of the High-Density Scintillator Cerium Fluoride", (11/88), *IEEE Transactions on Nuclear Science*, vol. NS-36.

Moses & Derenzo, "Cerium Fluoride, A New Fast, Heavy Scintillator", (11/88), *IEEE Transactions on Nuclear Science*, vol. NS-36.

Anderson, "Cerium Fluoride: A Scintillator For High-Rate Applications", (8/89), *Nuclear Instruments and Methods in Physics Research A287* (1990), pp. 606-612.

Derenzo et al., "Prospects For New Inorganic Scintillators", (1990), *IEEE Transactions on Nuclear Science*, vol. NS-37.

Fig. 1

PROPERTIES OF VARIOUS INORGANIC SCINTILLATORS

| | CeF$_3$ | BaF$_2$ | BGO | CsF | CsI | CsI(Tl) | NaI(Tl) | GSO |
|---|---|---|---|---|---|---|---|---|
| DENSITY | 6.16 | 4.9 | 7.13 | 4.64 | 4.53 | 4.53 | 3.67 | 6.71 |
| ABSORPTION LENGTH (l/e in cm, at 511 keV) | 1.9 | 2.3 | 1.1 | 2.3 | 1.8 | 1.8 | 2.9 | |
| RADIATION LENGTH (cm) | 1.7 | 2.1 | 1.1 | 2.0 | 1.86 | 1.86 | 2.6 | |
| DECAY CONSTANT -SHORT (n sec) | ≈5 | 0.6 | 300 | 2.8 | =10.36 | >1000 | 230 | 60 |
| -LONG | 30 | 620 | | 4.4 | >1000 | | 150ms | |
| PEAK EMISSION -SHORT (nm) | 310 | 220 | 480 | 390 | 300 | 550 | 415 | 430 |
| -LONG | 340 | 310 | | | >400 | | | |
| INDEX OF REFRACTION AT PEAK EMISSION | 1.68 | 1.56 | 2.15 | 1.48 | 1.8 | 1.8 | 1.85 | 1.9 |
| LIGHT YIELD [NaI(Tl)≡100] | 4-5 | 5 | 7-10 | 6 | 3.7 | 85 | 100 | 20 |
| | | 16 | | | | | | |
| HYGROSCOPIC | NO | SLIGHT | NO | VERY | SLIGHT | SLIGHT | YES | NO |
| PROBLEMS FOR PET | | q PMT SLOW COMP. | SLOW | HYG. COST | uv gl. PMT SLOW COMP. | SLOW | SLOW | COST |

EMISSION SPECTRUM AND TRANSMISSION AS A FUNCTION OF WAVELENGTH OF PURE CeF$_3$ AT ROOM TEMPERATURE

SCINTILLATION DECAY CURVE WITH A QUARTZ PMT AT ROOM TEMPERATURE

SCINTILLATION DECAY CURVE OF SLOW COMPONENT AT ROOM TEMPERATURE

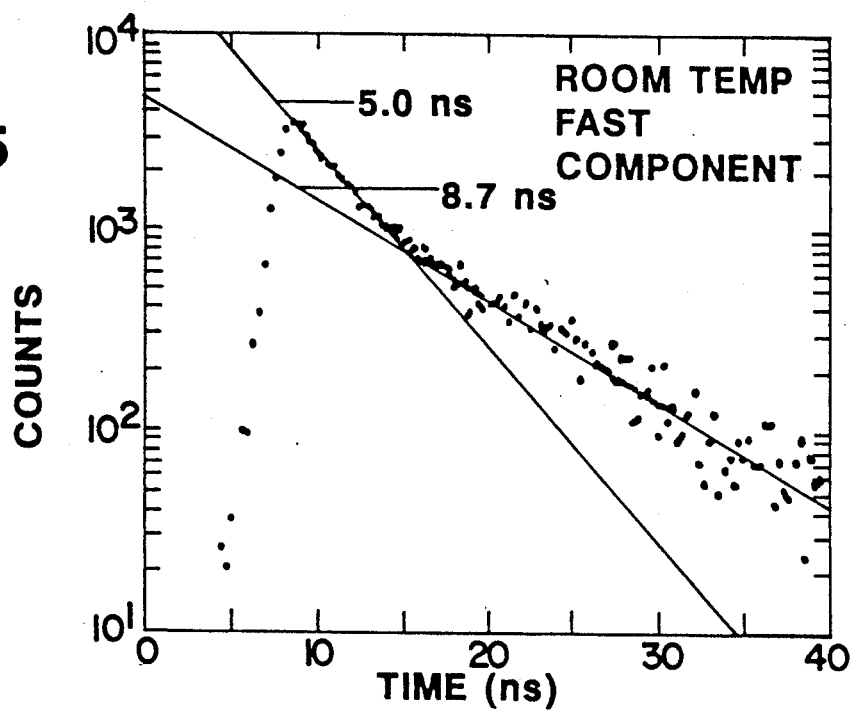
SCINTILLATION DECAY CURVE OF FAST
COMPONENT AT ROOM TEMPERATURE
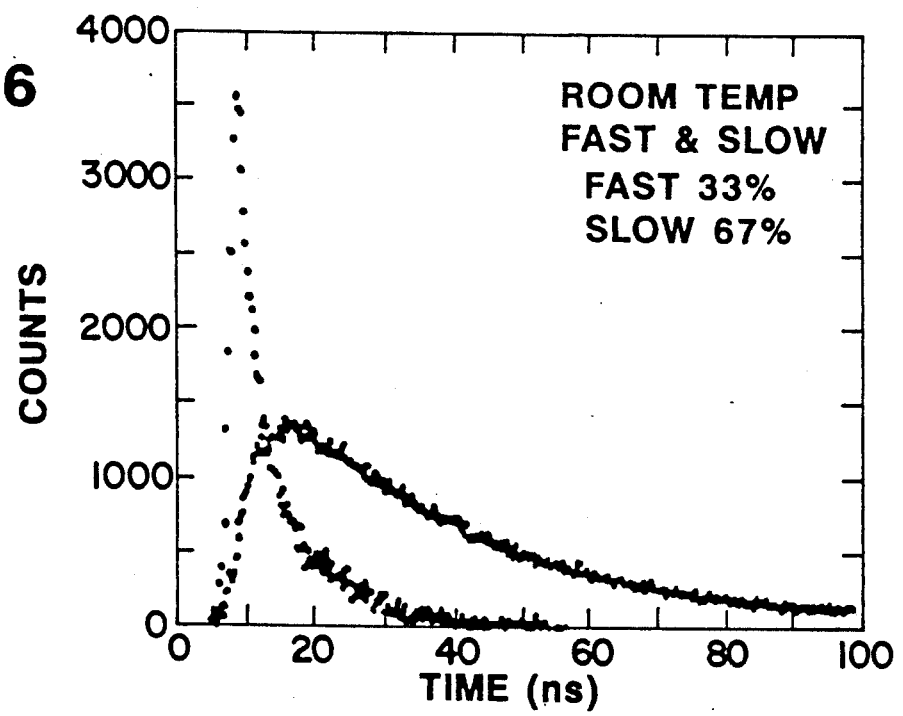
ROOM TEMPERATURE SCINTILLATION
DECAY CURVE OF FAST AND SLOW
COMPONENT ON A LINEAR SCALE SCINTILLATION DECAY CURVE, TAKEN WITH A QUARTZ PMT, OF 99% PURE MATERIAL DOPED WITH 0.5% $BaF_2$ SCINTILLATION DECAY CURVE, TAKEN WITH A GLASS FILTER, OF 99% PURE MATERIAL DOPED WITH 0.5% $BaF_2$

DIVALENT FLUORIDE DOPED CERIUM FLUORIDE SCINTILLATOR

This invention was made with Government support under Contract No. DE-AC-76CH03000, awarded by the United States Department of Energy. The Government has certain rights in the invention.

FIELD OF THE INVENTION

Scintillators are materials that emit flashes or pulses of light when they interact with ionizing radiation such as gamma rays. The present invention relates to scintillator materials comprising cerium fluoride. More particularly, the present invention relates to the use of divalent fluoride dopants in scintillator materials comprising cerium fluoride.

BACKGROUND OF THE INVENTION

The use of cerium fluoride as a scintillator material in the detection of ionizing radiation is disclosed in application Ser. No. 07/218,234, filed July 12, 1988, and incorporated herein by reference. There, the use of cerium fluoride as a scintillator material in gamma ray detectors for positron emission tomography ("PET") is also disclosed.

The value of PET as a clinical imaging technique is in large measure dependent upon the performance of the detectors. The typical PET camera comprises an array of detectors consisting of scintillator crystals coupled to photomultiplier tubes (PMTs). When a high energy photon or gamma ray strikes a detector, it produces light in the scintillator crystal that is then sensed by the PMT, which registers the event by passing an electronic signal to the reconstruction circuitry. The scintillator crystals themselves must have certain properties, among which are (1) good stopping power, (2) high light yield, and (3) fast decay time.

As applied to scintillators, stopping power is the ability to stop the 511 keV photons associated with PET in as little material as possible so as to reduce the overall size of the detector, of which the scintillator crystals form a substantial portion. Stopping power is typically expressed as the linear attenuation coefficient (tau) having units of inverse centimeters (cm$^{-1}$). After a photon beam has traveled a distance "x" in a crystal, the proportion of photons that have not been stopped by the crystal is calculated as follows:

fraction of unstopped photons $= e^{(-tau * x)}$.

Thus, after traveling a distance of 1/tau (the "absorption length"), approximately 37% of the photons will not have been stopped; 63% will have been stopped. Likewise, 63% of the remaining photons will have been stopped after traveling an additional distance of 1/tau. For PET and other applications involving the detection of ionizing radiation, it is desirable for 1/tau to be as small as possible so that the detector is as compact as possible.

Light yield is also an important property of scintillators. Light yield is sometimes referred to as light output or relative scintillation output, and is typically expressed as the percentage of light output from a crystal exposed to a 511 keV photon beam relative to the light output from a crystal of thallium-doped sodium iodide, NaI(Tl). Accordingly, the light yield for NaI(Tl) is defined as 100.

A third important property of scintillators is decay time. Scintillation decay time, sometimes referred to as the time constant or decay constant, is a measure of the duration of the light pulse emitted by a scintillator, and is typically expressed in units of nanoseconds (nsec). As discussed in application Ser. No. 07/218,234, if a scintillator's decay constant is short, then more of its time will be available for the detection of ionizing radiation, for example, in the case of PET, coincident photons, and the scintillator can be employed in high rate applications.

In addition to the three important properties discussed above, scintillator crystals should be easy to handle. For example certain known scintillators are hygroscopic, i.e., they retain moisture, making it necessary to very tightly encapsulate them to allow their use in detectors. These hygroscopic scintillators are more difficult to use.

Prior to cerium fluoride (CeF$_3$), known scintillators included (1) plastic (organic) scintillators, (2) gadolinium orthosilicate (Gd$_2$SiO$_5$, also referred to as "GSO"), (3) thallium-doped sodium iodide (NaI(Tl)), (4) undoped cesium iodide (CsI) and thallium-doped cesium iodide (CsI(Tl)), (5) cesium fluoride (CsF), (6) bismuth germanate (Bi$_4$Ge$_3$O$_{12}$, also referred to as "BGO"), and (7) barium fluoride (BaF$_2$).

Plastic (organic) scintillators, typically composed of polystyrene doped with a wavelength-shifting additive, are commercially available under such tradenames as PILOT U and NE 111. Upon excitation with a 511 keV photon, plastic scintillators emit a light pulse having a very fast decay constant of approximately 1.5 nsec and light output proportional to the energy of the incident photon. The main disadvantage of plastic scintillators is their low density (approximately 1.1 to 1.2 g/cm$^3$) due to the light atoms (hydrogen and carbon) that make up the molecules of the material. Because of their low density, plastic scintillators have poor stopping power, and are therefore poorly suited for use in PET and other applications involving the detection of ionizing radiation.

GSO, gadolinium orthosilicate (Gd$_2$SiO$_5$) is a scintillator well suited for PET with good stopping power, high light yield, and reasonable decay constant. The disadvantage of GSO is that it is very difficult to manufacture and prohibitively expensive, costing about fifty times as much as BaF$_2$ and CeF$_3$, and twenty times as expensive as BGO.

NaI(Tl), thallium-doped sodium iodide, has the best light output of the prior known scintillators listed above. NaI(Tl) also has reasonably good stopping power (1/tau=3.0 cm at 511 keV). However, NaI(Tl) has a long decay constant (250 nsec), a significant disadvantage for use in PET and other time-of-flight applications. NaI(Tl) is also highly hygroscopic, making it extremely difficult to handle in that it must be encapsulated in bulky cans.

CsI(Tl), thallium-doped cesium iodide, is not particularly well suited for PET because its decay time is greater than 1000 nsec, far too long for high rate applications like PET. Undoped CsI appears suitable for PET, although its slow component is a disadvantage for high rates. This slow component can be fairly effectively removed electronically, however.

CsF, cesium fluoride, has been used successfully in PET. CsF has two main disadvantages: first, it has a rather poor stopping power (absorption length (1/tau)=2.3 cm at 511 keV) and second, it is extremely hygroscopic. The poor stopping power of CsF limits its ability to localize the origin of the gamma rays in PET. The hygroscopic nature of CsF makes it difficult to handle.

BGO has the highest density (7.13 g/cm$^3$) of the prior known scintillator materials listed above. Its stopping power is the best (1/tau=1.1 cm at 511 keV) and, as a result, BGO is best able to absorb 511 keV photons efficiently in small crystals. However, BGO's very long decay constant (300 nsec), longer even than NaI(Tl), is a significant disadvantage for use in PET and other high rate applications involving the detection of ionizing radiation.

The use of BaF$_2$ as a scintillator material is described in Allemand et al. U.S. Pat. No. 4,510,394. BaF$_2$ emits light having two components: a slow component having a decay constant of approximately 620 nsec and a fast component having a decay constant of approximately 0.6 nsec. BaF$_2$ has a light yield of approximately 16% that of NaI(Tl) and about half the stopping power of BGO (1/tau=2.3 cm at 511 keV). Unlike CsF and NaI(Tl), BaF$_2$ is not hygroscopic.

The fast component of BaF$_2$ emits light in the ultraviolet region of the spectrum. Glass photomultiplier tubes are not transparent to ultraviolet light, so a quartz photomultiplier tube must be used to detect the fast component of BaF$_2$. Since quartz photomultiplier tubes are substantially more expensive than glass (by a factor of two), one would prefer to avoid using BaF$_2$, if possible, in favor of using a scintillator that can be detected by a glass photomultiplier tube. The fast component gives BaF$_2$ very good timing resolution, but the slow component limits its high rate capabilities. In other words, it takes BaF$_2$ longer to get ready for the next event. (This slow component can be fairly effectively removed electronically, however).

Of the prior known scintillator materials, BGO has the best stopping power, NaI(Tl) has the best light yield, and BaF$_2$ has the best timing resolution. However, as noted above, some of these known materials have significant shortcomings which hinder their performance as scintillators for PET and other applications involving the detection of ionizing radiation: BGO has a very long decay constant; NaI(Tl) also has a very long decay constant and is hygroscopic. Of these materials, BaF$_2$ has the best of stopping power, light output and decay constant, and does not present a problem with hygroscopy. However, the slow component of BaF$_2$ does limit its rate capabilities.

As disclosed in application Ser. No. 07/218,234, cerium fluoride, CeF$_3$, has been found to provide a balance of stopping power, light yield and decay constant that is superior to previously known scintillator materials. As a result, cerium fluoride is favorably suited for use as a scintillator in positron emission tomography and other applications involving the detection of ionizing radiation. The relevant properties of CeF3 as compared to those of prior known scintillator materials, are shown in FIG. 1.

As shown in FIG. 1, CeF$_3$ provides a balance of stopping power, light yield and decay constant that is superior to other known scintillator materials. In particular, CeF$_3$ exhibits a fast component of approximately 5 nsec and a slow component having a decay constant of approximately 30 nsec, both far superior to those of NaI(Tl) and BGO. With respect to light yield, CeF$_3$ exhibits a value of 4–5 percent that of NaI(Tl); its light yield is thus about one-half that of BGO. In addition, the absorption length (stopping power) of CeF$_3$ (1/tau=1.9 cm at 511 keV) is between that of BGO and BaF$_2$. Finally, CeF$_3$ exhibits no hygroscopy. In contrast to NaI(Tl), CeF$_3$ is superior in that its decay constant is far shorter and it is not hygroscopic, making it much easier to handle than NaI(Tl).

As further shown in FIG. 1, in contrast to BaF$_2$, CeF$_3$ has superior stopping power (1/tau) but inferior light yield. In addition, CeF$_3$ has a fast component like BaF$_2$. Moreover, while the fast component of BaF$_2$ can only be detected using expensive quartz photomultiplier tubes, the fast component of CeF$_3$ can be detected using much less expensive glass photomultiplier tubes. Finally, as shown in FIG. 1, in contrast to BGO, CeF$_3$ has inferior absorption length (stopping power) and light yield, but has a decay constant far superior to that of BGO. Thus, CeF$_3$ provides adequate stopping power and light yield with an improved decay constant.

In developing a commercial grade CeF$_3$ scintillator, the main objectives are to produce high quality CeF$_3$ scintillators reliably and at low cost. If possible, it is desirable to produce large crystals of uniformly clear, scatter-free CeF$_3$, while avoiding the use of extremely pure and thus expensive CeF$_3$ as a starting material. The use of extremely pure CeF$_3$ is prohibitively expensive on a commercial scale because of the difficulty in purifying CeF$_3$ in large quantities. Thus, if lower purity CeF$_3$ could be employed as a starting material, there would be a substantial reduction in the cost of producing cerium fluoride scintillators on a commercial scale.

OBJECTS OF THE INVENTION

It is therefore an object of the invention to provide high quality cerium fluoride scintillator crystals reliably and at low cost.

Another object of the invention is to produce large crystals of uniformly clear, scatter-free cerium fluoride, while avoiding the use of extremely pure cerium fluoride as a starting material.

A further object of the invention is to provide an economical method of producing high quality cerium fluoride scintillator crystals in large quantities.

SUMMARY OF THE INVENTION

The above objects are accomplished by a scintillator material comprising cerium fluoride and a divalent fluoride dopant. The preferred divalent fluoride dopants are calcium fluoride, strontium fluoride, and barium fluoride. The preferred amount of divalent fluoride dopant is less than about two percent by weight of the total scintillator.

The method of preparing the improved cerium fluoride scintillator comprises adding a scintillation-enhancing divalent fluoride dopant, preferably in the form of calcium fluoride, strontium fluoride, or barium fluoride, and preferably in an amount less than about two percent by weight of the total scintillator.

The scintillator can be used to detect ionizing radiation, such as in the form of high energy photons and gamma rays. The divalent fluoride doped scintillator is particularly well suited for use in cameras for positron emission tomography and for performing position emission tomography and detecting ionizing radiation generally.

BRIEF DESCRIPTION OF THE DRAWINGS

FIG. 1 is a table showing the relevant properties of CeF3 to those of prior known scintillator materials.

FIG. 5 is a graph showing the scintillation intensity as a function of time (decay curve) of the fast component of extremely pure $CeF_3$, at room temperature.

FIG. 6 is a graph showing the scintillation intensity as a function of time (decay curve), on a linear scale, of the slow and fast components of extremely pure $CeF_3$, at room temperature.

DETAILED DESCRIPTION OF THE DRAWINGS

As discussed above, FIG. 1 is a tabulation of the relevant properties of $CeF_3$ as compared to those of prior known scintillator materials. As shown in FIG. 1, $CeF_3$ falls between BGO and $BaF_2$ with respect to properties such as density (6.16 $g/cm^3$), absorption length at 511 keV (1.9 cm), and index of refraction (1.68). Like BaF2, $CeF_3$ has at least two emission components with decay times of approximately 5 nsec and 30 nsec. Although fast component of $CeF_3$ is not as fast as the fast component of $BaF_2$, its slow component is a factor of 20 times faster than the slow component of $BaF_2$ and a factor of 10 faster than BGO. The amount of light emitted by $CeF_3$ is approximately 50% that of BGO and about the same order of magnitude as the fast component of $BaF_2$. A timing resolution for a single $CeF_3$ PET crystal of 0.56 nsec has also been achieved.

Figure 2:
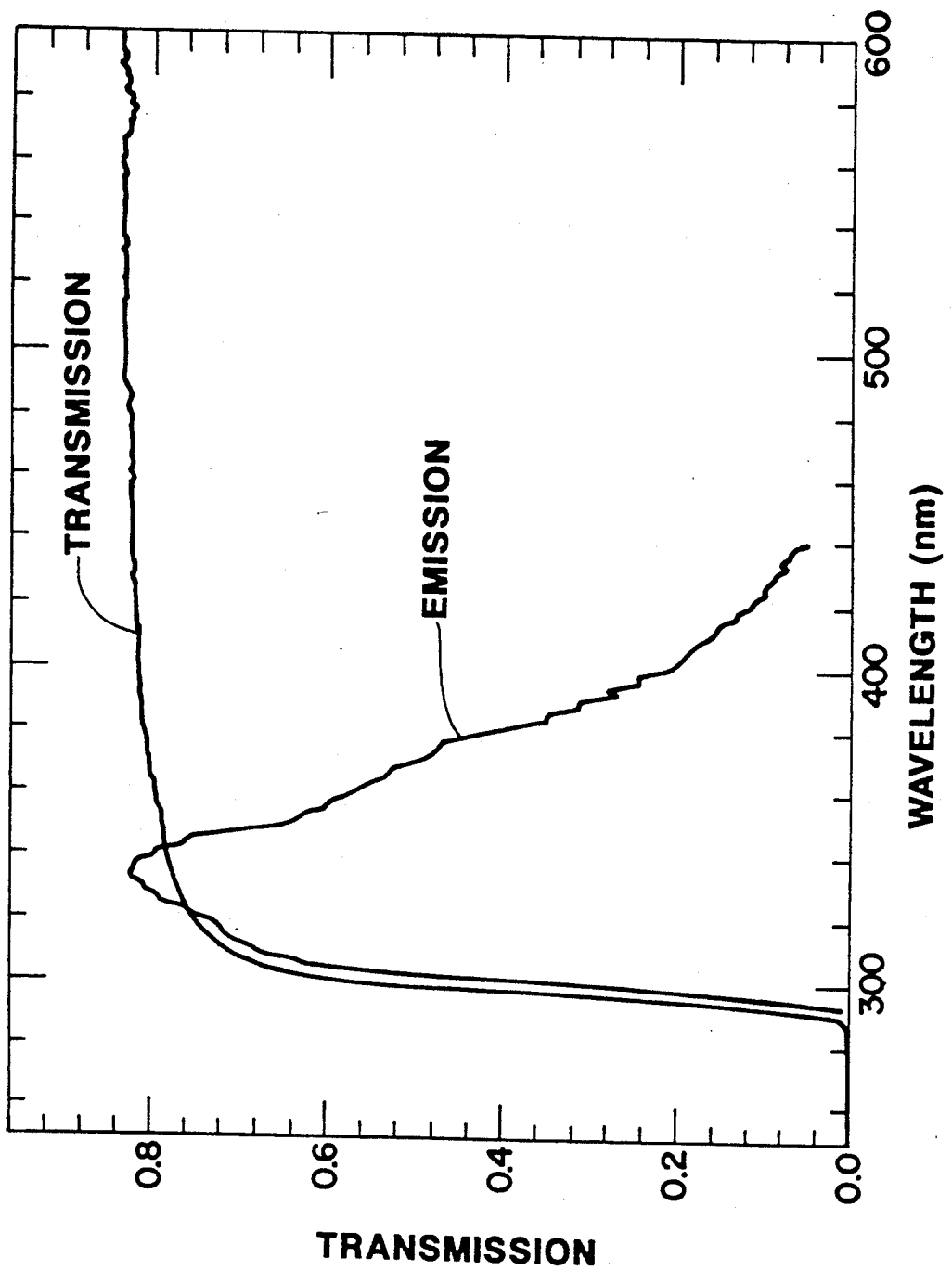
FIG. 2 is a graph showing the amount of light transmitted and emitted upon excitation with 254 nm ultraviolet light, by wavelength, of extremely pure $CeF_3$ at room temperature.

Turning next to FIG. 2, the emission and transmission intensities are plotted as a function of wavelength for extremely pure $CeF_3$ at room temperature. As shown in FIG. 1, the peak emission is at about 340 nm, but as will be discussed in more detail below, there are actually two components of this emission. In comparing the light output with a quartz and a glass PMT, the quartz PMT gave about 15% greater signal.

Figure 3:
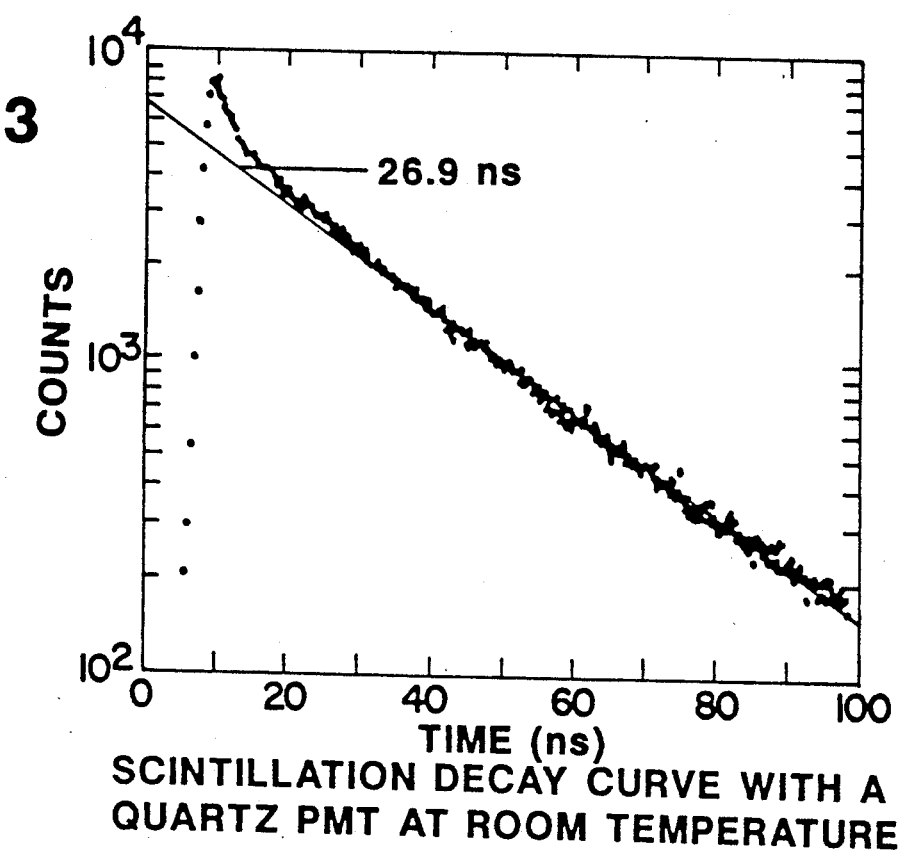
FIG. 3 is a graph showing the scintillation intensity as a function of time (decay curve) for extremely pure $CeF_3$, taken with a quartz photomultiplier tube at room temperature.

The scintillation intensity as a function of time (decay curve) for extremely pure $CeF_3$, taken with a quartz photomultiplier tube at room temperature is shown in FIG. 3. It is evident from FIG. 3 that there is more than one decay constant present. A simple fit yields a decay constant of 26.9 nsec.

Figure 4:
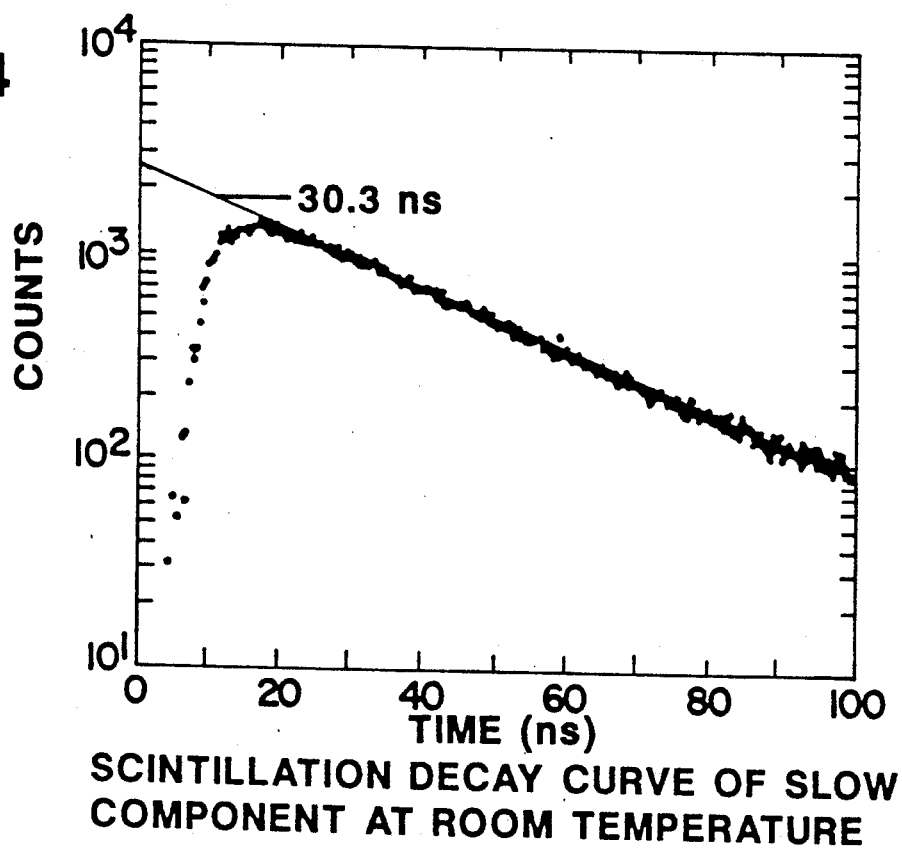
FIG. 4 is a graph showing the scintillation intensity as a function of time (decay curve) of the slow component of extremely pure $CeF_3$, at room temperature.

To separate the components of the decay spectrum, a glass filter (with a cutoff at about 330 nm) was placed over the face of the quartz PMT. This filter combination removes much of the fast component, somewhat more than would be removed by a glass PMT alone. This decay curve was normalized to the quartz PMT decay curve of FIG. 3 at long scintillation times and subtracted from FIG. 3. Since the spectrum that remains corresponds to the bluest light and is therefore associated with the short decay component, a decay curve with only the fast component is thus generated. The latter curve is then renormalized such that it equals the apparent residual fast component in the spectrum taken with the glass filter and subtracted from the glass filter curve. The result of this subtraction, which yields the decay curve for the slow component of extremely pure $CeF_3$ at room temperature, is shown in FIG. 4. FIG. 4 is well fit by a single decay constant of 30.3 nsec.

The decay curve for the fast component of extremely pure $CeF_3$ at room temperature results from the subtraction of FIG. 4 from FIG. 3, and is shown in FIG. 5. FIG. 5 can be fitted with two decay constants of 5.0 and 8.7 nsec. The longer decay constant may represent a third component to the decay, or it may simply be an artifact of the technique used to separate the decay constants. FIG. 6 shows the fast and slow components of extremely pure $CeF_3$ on a linear scale. At room temperature, the fast component of $CeF_3$ produces about 33% of the scintillation.

As stated above, divalent fluorides added in amounts less than about 2% by weight of the total scintillator have proven useful in the growing of clear material. Examples of such divalent fluorides are $CaF_2$, $SrF_2$, and $BaF_2$. $CeF_3$ scintillator crystals grown with the addition of a divalent fluoride have exhibited better transmissions and higher light outputs than crystals grown without the addition of such dopants. $CaF_2$ is the most preferred dopant, presumably because it has a lattice size that is similar to that of $CeF_3$. The amount of additive necessary depends upon the purity of the starting material.

In attempting to reduce the cost of producing commercial grade $CeF_3$, the use of less than extremely pure starting materials is preferred. In this regard, starting materials of only 99% pure $CeF_3$ were employed, with the remaining 1% consisting primarily of other rare earth elements such as $DyF_3$, $EuF_3$, $YbF_3$, $GdF_3$ and $SnF_3$. The term "rare earth" is a misnomer in that they are not rare; their expense is due primarily to the difficulty in their purification. If such comparatively low purity starting materials can be employed in the preparation of commercial grade scintillators, there would be a substantial reduction in production costs.

Figure 7:
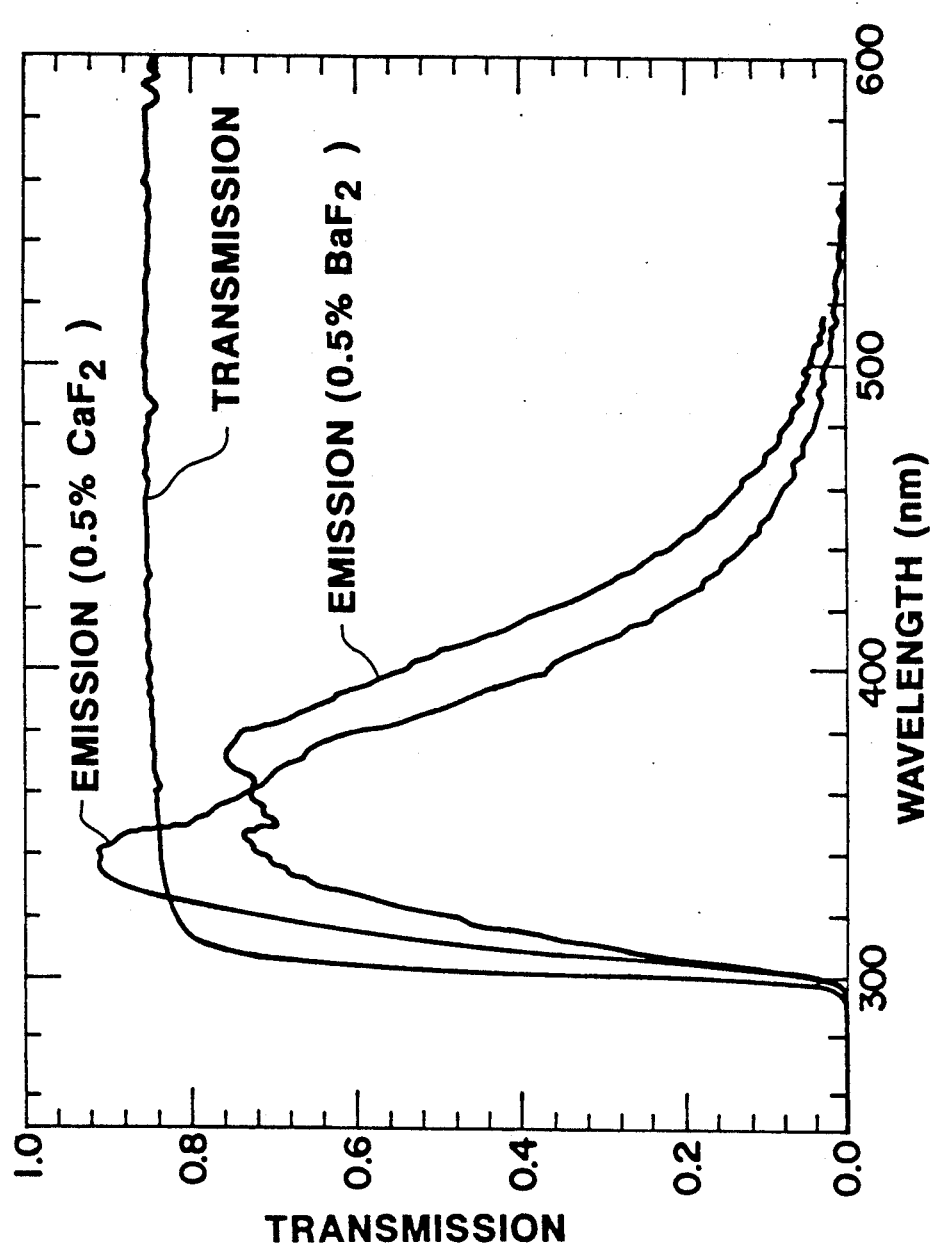
FIG. 7 is a graph showing the amount of light transmitted by wavelength of 99% pure $CeF_3$ starting material doped with 0.5% $CaF_2$ and the amount of light emitted upon excitation with 254 nm ultraviolet light, by wavelength, of two samples doped with 0.5% $CaF_2$ and 0.5% $BaF_2$.

Good transmissions have been achieved with the addition of a small amount of divalent fluoride to the 99% pure $CeF_3$ starting material. FIG. 7 shows the transmission spectrum of 99% pure $CeF_3$ starting material doped with 0.5% $CaF_2$. The sharp cutoff at short wavelengths is typical in 99% pure $CeF_3$ doped with other divalent fluorides. FIG. 7 also shows the emission spectra (excited with 254 nm ultraviolet light) of two samples, one doped with 0.5% $CaF_2$ and the other doped with 0.5% $BaF_2$. The $BaF_2$ doped material exhibited an emission spectrum that differed significantly from that of pure $CeF_3$; the emission spectrum of the $CaF_2$ doped material differed less significantly from that of extremely pure $CeF_3$. Both samples showed a reduction in light output of about 37% less than the light output from a sample prepared from extremely pure starting material.

Figure 8:
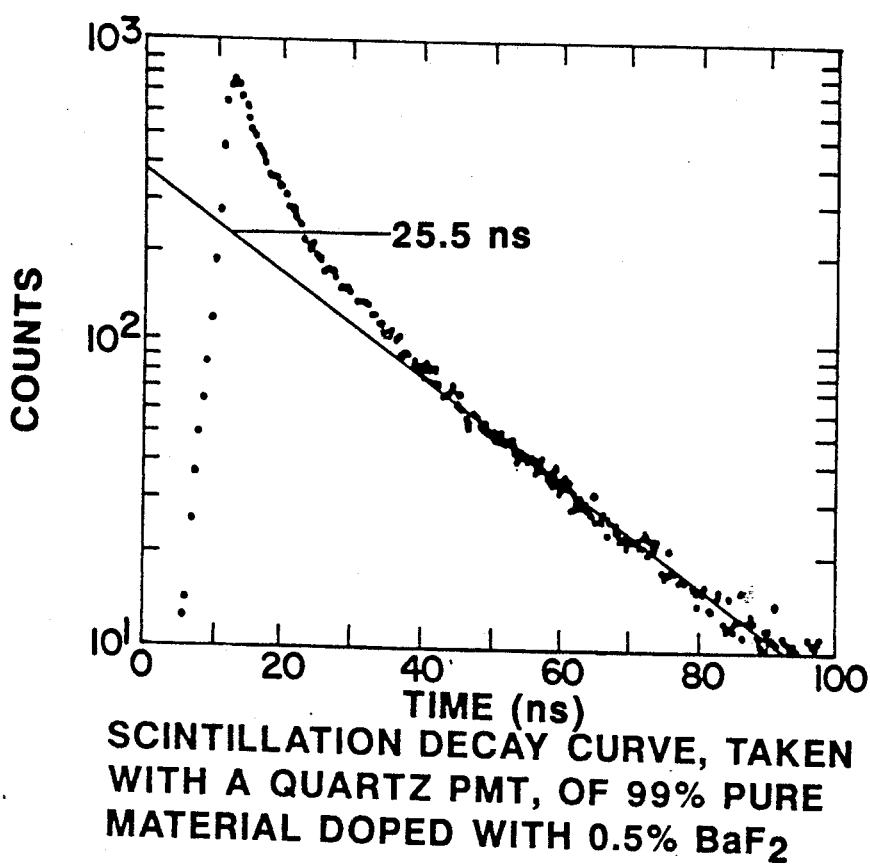
FIG. 8 is a graph showing the scintillation intensity as a function of time (decay curve) for 99% pure $CeF_3$ starting material doped with 0.5% $BaF_2$, taken with a quartz photomultiplier tube at room temperature.

FIG. 8 shows the decay curve of the sample doped with 0.5% BaF$_2$, taken with a quartz PMT at room temperature. In comparison to FIG. 3, FIG. 8 exhibits a much higher fraction of the signal in the fast component.

Figure 9:
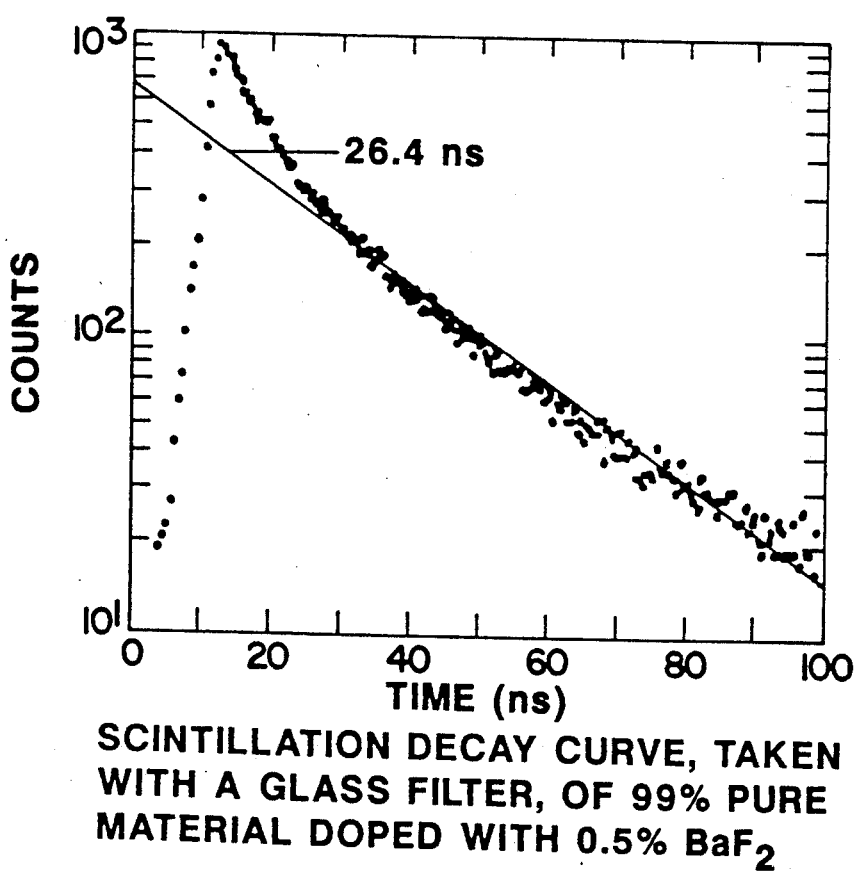
FIG. 9 is a graph showing the scintillation intensity as a function of time (decay curve) for 99% pure $CeF_3$ starting material doped with 0.5% $BaF_2$, taken with the addition of a glass filter to the quartz photomultiplier tube at room temperature.

The decay curve shown in FIG. 9 was obtained with the addition of a glass filter. In comparison to FIG. 6, which is similar to the raw data for the extremely pure CeF$_3$ crystal using the glass filter, it is evident that much more of the fast component remains. The fast component is thus shifted toward the longer wavelengths. The decay curves for the CaF$_2$ doped material was almost indistinguishable from those resulting from BaF$_2$ doped material.

The results of the analysis of the decay spectrum of the 99% pure CeF$_3$ material confirm that all of the 37% reduction in light output is due to the slow component of the emission. By combining the fast component of the extremely pure CeF$_3$ (FIG. 5) with 45% of its slow component (see FIG. 4), the resulting decay spectrum was found to be almost identical to the decay spectra of the 99% pure CeF$_3$ doped with either CaF$_2$ or BaF$_2$. These results are analogous to the behavior noted for BaF$_2$ scintillators, where the addition of a small concentration of dopant such as Tm or La causes a substantial reduction in the slow component while having little effect on the fast component.

In view of the foregoing, a divalent fluoride doped cerium fluoride scintillator is provided having good stopping power and favorable mechanical properties. Among its most important advantages over prior known scintillators are its very fast decay constants of approximately 5 nsec and 30 nsec, without the very long component (sometimes several hundred nanoseconds) of other scintillators.

The cerium fluoride scintillators described herein are useful in nuclear physics applications and in applications involving radiation detection and monitoring, and are particularly well suited for high-rate applications such as positron emission tomography (PET). Cerium fluoride scintillators are also useful in applications having high background signals, and these scintillators may also be useful in applications such as the detection of the 10.8 MeV nitrogen gamma line in explosive materials.

While particular embodiments and applications of the present invention have been shown, it will be understood, of course, that the invention is not limited thereto since modifications may be made by those skilled in the art, particularly in light of the foregoing teachings. It is therefore contemplated by the appended claims to cover any such modification as incorporate those features which come within the true spirit and scope of the invention.

What is claimed is:

1. A scintillator comprising cerium fluoride and a divalent fluoride dopant, said scintillator having a fast component with a decay constant of about 5 nanoseconds and a slow component with a decay constant of about 30 nanoseconds.

2. The scintillator of claim 1 wherein said dopant is calcium fluoride.

3. The scintillator of claim 1 wherein said dopant is strontium fluoride.

4. The scintillator of claim 1 wherein said dopant is barium fluoride.

5. The scintillator of claim 1 wherein said dopant is present in an amount less than about two percent by weight of the total scintillator.

6. The scintillator of claim 1 wherein said scintillator is used to detect ionizing radiation.

7. The scintillator of claim 6 wherein said ionizing radiation is in the form of high energy photons.

8. The scintillator of claim 6 wherein said ionizing radiation is in the form of gamma rays.

9. The scintillator of claim 1 wherein said scintillator is used in position emission tomography.

10. A scintillator comprising cerium fluoride and a scintillation-enhancing dopant represented by the formula XF$_2$, wherein X is selected from the group consisting of calcium, strontium and barium.

11. The scintillator of claim 10 wherein said dopant is present in an amount less than about two percent by weight of the total scintillator.

12. The scintillator of claim 10 wherein said scintillator is used to detect ionizing radiation.

13. The scintillator of claim 12 wherein said ionizing radiation is in the form of high energy photons.

14. The scintillator of claim 12 wherein said ionizing radiation is in the form of gamma rays.

15. The scintillator of claim 10 wherein said scintillator is used in position emission tomography.

16. A method of preparing a scintillator comprising cerium fluoride comprising adding a scintillation-enhancing divalent fluoride dopant.

17. The method of claim 16 wherein said dopant is calcium fluoride.

18. The method of claim 16 wherein said dopant is strontium fluoride.

19. The method of claim 16 wherein said dopant is barium fluoride.

20. The method of claim 16 wherein said dopant is added in an amount less than about two percent by weight of the total scintillator.

21. A camera for use in positron emission tomography comprising a scintillator comprising cerium fluoride and a divalent fluoride dopant, said scintillator having a fast component with a decay constant of about 5 nanoseconds and a slow component with a decay constant of about 30 nanoseconds.

22. The camera of claim 21 wherein said dopant is represented by the formula XF$_2$, wherein X is selected from the group consisting of calcium, strontium and barium.

23. The camera of claim 21 wherein said dopant is present in an amount less than about two percent by weight of the total scintillator.

24. The method of detecting ionizing radiation which comprises using a scintillator comprising cerium fluoride and a divalent fluoride dopant, said scintillator having a fast component with a decay constant of about 5 nanoseconds and a slow component with a decay constant of about 30 nanoseconds.

25. The method of claim 24 wherein said ionizing radiation is in the form of high energy photons.

26. The method of claim 25 wherein said ionizing radiation is in the form of gamma rays.

27. The method of claim 24 wherein said dopant is represented by the formula XF$_2$, wherein X is selected from the group consisting of calcium, strontium and barium.

28. The method of claim 24 wherein said dopant is present in an amount less than about two percent by weight of the total scintillator.

29. The method of performing positron emission tomography which comprises using a scintillator comprising cerium fluoride and a divalent fluoride dopant, said scintillator having a fast component with a decay constant of about 5 nanoseconds and a slow component with a decay constant of about 30 nanoseconds.

30. The method of claim 29 wherein said dopant is represented by the formula $XF_2$, wherein X is selected from the group consisting of calcium, strontium and barium.

31. The method of claim 29 wherein said dopant is present in an amount less than about two percent by weight of the total scintillator.

* * * * *